Patented Feb. 13, 1923.

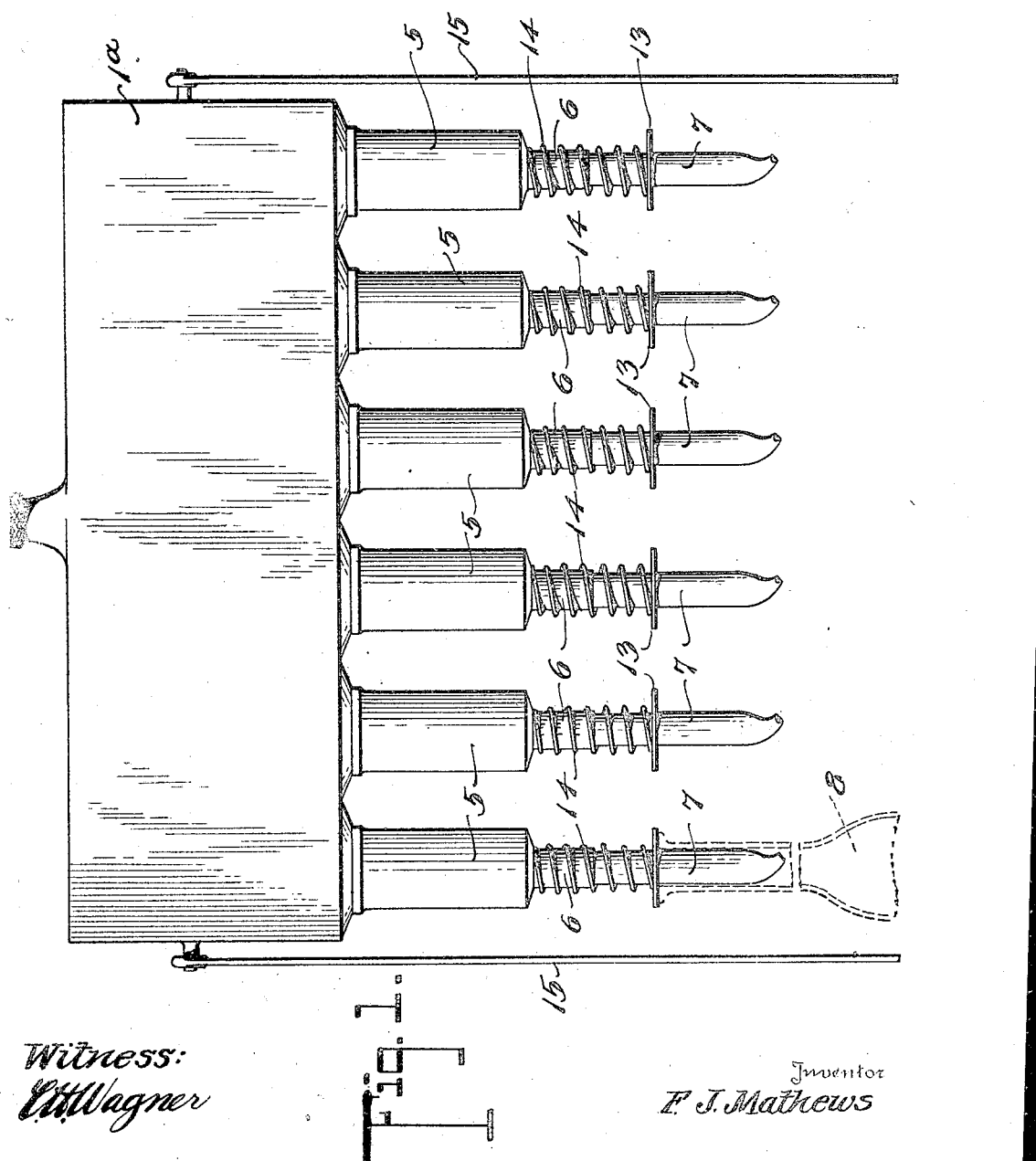

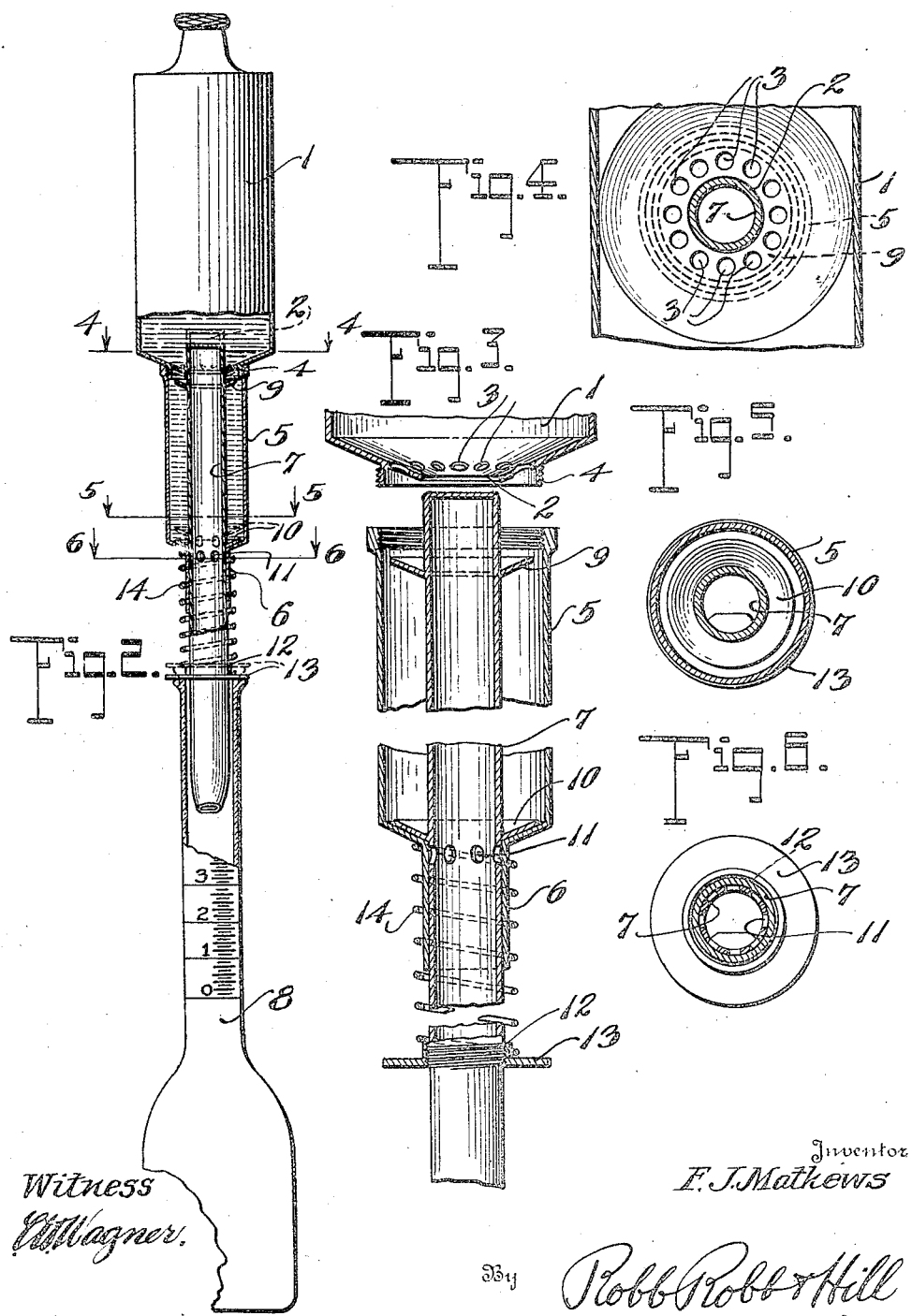

1,445,339

UNITED STATES PATENT OFFICE.

FRANK J. MATHEWS, OF DEER PARK, WISCONSIN.

DISPENSING APPARATUS.

Application filed September 26, 1921. Serial No. 503,279.

*To all whom it may concern:*

Be it known that I, FRANK J. MATHEWS, a citizen of the United States, residing at Deer Park, in the county of St. Croix and State of Wisconsin, have invented certain new and useful Improvements in Dispensing Apparatus, of which the following is a specification.

The present invention appertains to improvements in dispensing apparatus and in particular to that type designed primarily for the purpose of delivering measured or predetermined quantities of a liquid into a receptacle as an incident to the coaction of the latter with the delivery controlling means.

The apparatus of this invention is devised especially for facilitating the testing of the butter value of milk and cream according to the well-known Babcock-test method. It is customary in carrying out such method to employ a graduated test bottle in which a certain amount of milk or cream is weighed and to pour into this a measured quantity of acid, the bottle being then placed upon a centrifugal machine the operation of which will determine the butter fat content.

It is thus the object of this invention as above premised to provide an apparatus which will render the introduction of the acid into the test bottle, a simple step of the method which may be quickly and easily performed.

For a full understanding of the invention, reference is to be had to the following description and accompanying drawings in which:

Figure 1 is a side elevation of an apparatus constructed in accordance with the principles of this invention and having multiple acid delivering and measuring means.

Figure 2 is a view in elevation of a simple or single type of apparatus, parts being broken away and shown in section to disclose more clearly the details of the arrangement.

Figure 3 is an enlarged sectional view of the measuring elements of the apparatus.

Figures 4, 5 and 6 are sectional views on the lines 4—4, 5—5 and 6—6, respectively, of Figure 2.

Throughout the following detailed description and on the several figures of the drawing, similar parts are referred to by like reference characters.

Referring to Figure 2 of the drawings, which as hereinbefore mentioned discloses the simpler form of this apparatus, 1 designates a liquid reservoir of suitable capacity in which the acid which is to be dispensed in measured quantities is contained, this receptacle having a conventional filling opening at the top and preferably a hopper type of bottom having a suitable tube receiving opening 2 surrounding which is provided a series of discharge openings 3, any suitable number of which may be provided. Surrounding the discharge openings is formed a threaded flange 4 to which the measuring container or receptacle 5 is detachably connected. This receptacle 5 is of a predetermined capacity, such that when filled it will contain the predetermined quantity of liquid which it is desired to dispense at a particular time. Obviously this therefore may be varied in size according to the quantity which it is desired to dispense. The lower end of the receptacle 5 is formed with a depending neck 6 to slidingly receive the valve controlling member 7. This latter element is of sufficient length to extend upwardly a short distance into the reservoir 1, as shown in Figure 2, and to protrude through the neck 6 of the container 5 a suitable distance to enable a Babcock-test bottle 8 of conventional form to be telescoped upon this lower end, also as shown in Figure 2.

At the upper portion, the valve member 7 is provided with an annular closure flange 9 which is given a concave shape such that it will fit or conform to the bottom of the reservoir 1 and when in coacting relation thereto to close the series of discharge openings 3. At a point spaced from the flange 9 is a corresponding one 10 which fits the bottom of the measuring receptacle 5 and normally rests thereupon as shown in Figures 3 and 4 when the valve member is in operative position. Just beneath this flange 10 the valve member is provided with an annular series of discharge openings 11 which in the normal position of the valve member coact with the neck 6 of the measuring chamber so as to close said openings and effectively prevent escape of the liquid content in the measuring receptacle. At a point in the length of the valve member suitable threads 12 are formed to receive an adjustable collar 13 between which and the base of the measuring receptacle 5 is seated a spiral spring 14. The action of the spring just mentioned is to accelerate the gravitating movement of the valve controlling member 7 and to normally hold the latter in its position shown in Figure 3.

With this apparatus just described the acid test for the butter value is carried out in the following manner. First, the sample of the milk or cream is placed in the test bottle 8 and weighed. The bottle is now placed underneath the dispensing apparatus in a position to bring the mouth of the bottle into contact with the collar 13 in which position the lower extremity of the valve member protrudes into the neck of the test bottle. By now lifting the bottle the valve member is raised into the dotted line position shown in Figure 2 which results in movement of the flange 9 into the position seated over the discharge openings, effectively closing communication between the liquid reservoir 1 and the measuring receptacle 5, previous to which the latter has received the predetermined quantity of acid from the former. This same action simultaneously raises the openings 11 of the valve member 7 to a position permitting the escape of the liquid in the measuring receptacle 5 through the tubular member 7 and into the test bottle. The exact quantity desired is thus quickly introduced into the milk and the test bottle is then placed upon the centrifugal apparatus which is operated to give the desired reading. Immediately the bottle is removed or lowered in the foregoing operation the spring tension quickly lowers the valve member so as to cut off the discharge openings 11 and to open the discharge openings 3, thus permitting a further quantity of the acid in the reservoir 1 to pass into the measuring receptacle 5. The apparatus is now in position for a further delivery operation.

The form of the apparatus shown in Figure 1 is an adaptation of that disclosed in Figure 2 by means of which a number of dispensing operations may be carried out at one time. The reservoir 1ª is of course of suitable capacity to hold a quantity of the liquid to be dispensed and its base portion has connected thereto a series of the measuring receptacles 5, all of corresponding form and construction. Suitable standards or supports 15 may be provided for the apparatus. It will be understood of course that the device is capable of being used in other operations than that which has been set forth herein,—in other words, any form of liquid may be dispensed in predetermined quantities with this type of apparatus and its description in conjunction with the test of butter fat is merely illustrative of one adaptation.

Having thus described my invention, what I claim as new and desire to secure by Letters Patent is:

In dispensing apparatus of the class described, a liquid holding reservoir having a tube receiving opening and a series of discharge openings at the base thereof surrounding the tube opening, a measuring receptacle adapted for detachable connection with the reservoir to receive a predetermined quantity of the liquid therefrom, said measuring receptacle being formed with a depending neck at the base thereof, a tubular valve member mounted in said measuring receptacle and extending upwardly through the tube receiving opening and having an annular flange at the upper portion thereof adapted to cooperate with the annular discharge openings of the reservoir for closing communication between the reservoir and the measuring receptacle and a second flange spaced from the first mentioned flange for supporting the valve member in normal operative position, said valve member having discharge openings therein annularly arranged below the second flange and cooperative with the neck of the measuring receptacle whereby to close the openings and prevent discharge of the contents of the measuring receptacle, a collar member having threaded connection with the valve member at a point spaced from the discharge end thereof by means of which the latter may be raised to discharge the contents of the measuring receptacle, and a spring surrounding the neck of the measuring receptacle and bearing on the collar member for actuating the valve member to restore it to normal closed position, the tension of said spring being adjustable by the adjustment of the collar member.

In testimony whereof I affix my signature.

FRANK J. MATHEWS.